ate of Patent: Apr. 20, 1993

United States Patent [19]

Kuyzin

[11] Patent Number: 5,204,170
[45] Date of Patent: Apr. 20, 1993

[54] HIGH DENSITY STRUCTURAL REACTION INJECTION MOLDED COMPOSITE CONTAINING A FABRIC OF NONWOVEN SPUNBONDED FIBERS MADE OF A POLYESTER CORE SHEATHED IN A POLYAMIDE SKIN EMBEDDED IN A POLYURETHANE MATRIX

[75] Inventor: Gregg S. Kuyzin, Ypsilanti, Mich.

[73] Assignee: BASF Corporation, Parsippany, N.J.

[21] Appl. No.: 738,773

[22] Filed: Aug. 1, 1991

[51] Int. Cl.$^5$ ............................................. D03D 3/00
[52] U.S. Cl. ................................... 428/244; 264/257; 264/258; 264/331.19; 425/542; 428/225; 428/251; 428/284; 428/285; 428/296; 428/373; 428/408; 428/423.1
[58] Field of Search ............... 428/245, 251, 296, 284, 428/225, 408, 423.1, 373, 224; 425/542; 264/331.19, 257, 258

[56] References Cited

U.S. PATENT DOCUMENTS

| | | | |
|---|---|---|---|
| 4,107,100 | 8/1978 | Peterhans et al. | 428/423 |
| 4,243,755 | 1/1981 | Marx et al. | 521/99 |
| 4,596,835 | 6/1986 | Werner et al. | 521/122 |
| 4,816,329 | 3/1989 | Arnaud | 428/280 |

OTHER PUBLICATIONS

Kuyzin, G. S., et al. "Non-Glass Reinforcement of Low-Density SRIM-For Automotive Interior Trim Parts", 32nd Annual Polyurethane Technical/Marketing Conference, Oct. 1-4, 1989, pp. 280-287.
Wilkinson, et al., "Structual Composites by Reaction Molding", 31st International SAMPE Symposium, Apr. 7-10, 1986, pp. 1064-1069.
Gonzales-Romero, et al., "Process Parometers Estimation for Structural Reaction Injection Molding and Resin Transfer Molding", Polymer Engineering and Science, vol. 30, Mid-Feb., 1990, pp. 142-146.
Reitz, J. A., et al., "New Directions in RIM Structural Composites", Proc. SPI Annual Technical/Marketing Conference, 31st Polyurethanes, 1988, pp. 75-79.
Kia, Hamid, "A Technique for Predicting Molding Conditions which Result in Class A Surfaces for Glass Fiber Reinforced Polymers", Journal of Composites Material, vol. 22(9), Sep., 1988, pp. 794-811.

*Primary Examiner*—James J. Bell
*Attorney, Agent, or Firm*—Dennis V. Carmen

[57] ABSTRACT

A high density structural reaction injection molded (SRIM) composite having a fabric comprised of nonwoven spunbonded fibers made of a polyester core sheathed in a polyamide skin, is embedded in a polyurethane matrix, providing a part having a blister free surface upon baking in a paint oven. A baked part having a near Class A or Class A surface finish can be attained by adding a show surface veil made of a soft nonwoven polyester fiber mat to the polyurethane matrix over the nonwoven spun bonded fabric. These parts have structural applications which require high strength and good surface finishes, such as in automotive exterior panels.

24 Claims, No Drawings

HIGH DENSITY STRUCTURAL REACTION INJECTION MOLDED COMPOSITE CONTAINING A FABRIC OF NONWOVEN SPUNBONDED FIBERS MADE OF A POLYESTER CORE SHEATHED IN A POLYAMIDE SKIN EMBEDDED IN A POLYURETHANE MATRIX

BACKGROUND OF THE INVENTION

1. Field of the Invention

The present invention relates to the field of structural reaction injection moldings. More particularly, the subject invention pertains to high density fiber reinforced polyurethane/polyisocyanate parts especially adapted for automotive applications requiring a "near Class A" or a "Class-A" surface appearance. Such high density fiber-reinforced reaction injection molded systems are known as high density structural-RIM or high density SRIM.

2. Description of the Related Art

The growth of high density SRIM in the automotive industry has been limited by the inability to achieve "Class A" surface finishes in exterior applications. For the most part, high density SRIM parts have been relegated to use in hidden part applications such as bumper beams, floor pans, and chassis components. However, SRIM offers many advantages over conventional molding processes, such as high manufacturing volumes due to short cycle times, low labor costs, relatively low molding pressures and low mold temperatures in the manufacture of high strength composite materials.

The sheet molding compound (SMC) process has been used extensively as a compression molding process to manufacture exterior body parts. In the SMC process, a sheet of material typically made of calcium carbonate filler, chopped strand glass, unsaturated polyesters, and various additives dissolved in styrene is charged into a mold heated at temperatures from 284° to 392° F. (140° to 200° C.), and the mold is closed under a press tonnage of about 2000 tons. Molding pressures reach from 1000 to 4000 p.s.i. The high mold temperatures activate a reaction between the styrene and the unsaturated polyester to crosslink the final material, providing a "near Class A" or "Class A" surface. As a result of the large quantity of glass and calcium carbonate in SMC (typically around 76 wt. %), overall thermal shrinkage arising from the difference in the coefficient of linear thermal expansion (CLTE) between the polymer matrix and the glass/fillers is small. However, in the SMC process, large quantities of glass/filler are needed to achieve a "Class A" finish, which raises costs, and does not have the advantage of higher strengths achieved by the presence of a reinforcing mat as in the SRIM and RTM processes. Furthermore, tooling and energy costs are high due to the large molding pressures, press tonnage, and high mold temperatures required.

An alternative process gaining considerable growth as a method of manufacturing exterior body panel parts is the Resin Transfer Molding (RTM) process. The materials of manufacture in RTM include polyesters, vinylesters, or epoxy resins. In the reinforced RTM process, low viscosity reactants are statically mixed and injected at approximately 50 to 200 p.s.i. into an optionally heated mold containing a reinforcing mat. Curing times range from 5 to as long as 30 minutes. As a result of the low molding pressures and the generally unheated mold, tooling and energy costs are low. The slow cure times permit one use a slow rate of injection, thereby ensuring that air entrainment is kept minimal. The drawback to this process, however, is that long cure times considerably reduce manufacturing volumes.

The SRIM process is advantageous over the SCM process in that high manufacturing volumes can be achieved both at low molding pressures ranging from 200-220 p.s.i., thereby reducing tooling and equipment costs, and at low molding temperatures ranging from 140°-180° F. (60°-82° C.), thereby reducing energy costs. SRIM parts contain a reinforcing mat which can greatly improve the tensile strength and flex modulus of the final part. Unlike the RTM process, the matrix polymer in SRIM is typically polyurethane/isocyanurate, which has a very short cure time ranging from 45 seconds to 2 minutes, advantageously resulting in high manufacturing volumes. In high density SRIM, the polyisocyanate "A" side and the polyol resin "B" side are impingement mixed and injected into a heated mold containing a reinforcing mat. Since such compositions cure so quickly, high injection rates are required, which unfortunately cause air bubbles to become trapped in the molded part. Upon baking the finishing paint onto the molded part, these air bubbles rise to surface and/or cause the polymer matrix to separate from the reinforcing mat, reducing strength and causing blisters to appear on the surface of the final part. A blistered surface on a baked part is one factor hindering a from attaining a "Class A" finish. Reducing the injection rate to prevent air entrainment, however, would negate the high manufacturing volumes associated with the SRIM process.

Besides the problem of air entrainment encountered in the high density SRIM process, another disadvantage faced by both SRIM and RTM processes is that glass reinforcing mats often abrade and scratch mold surfaces, which in turn are transferred to the molded article and ruin an otherwise "Class A" finish. To solve this latter problem, one may employ a chopped fiber reinforcement process (RRIM) where the short glass and/or mineral fibers are directly incorporated into the polyol resin "B side" of the two component system rather than laid on a mold surface. However, the chopped fibers not only raise the viscosity of the system thereby seriously affecting the ease of processing, but also reduce the strength of the molded article as compared to mat reinforced RTM and high density SRIM. Parts produced by RRIM are largely unusable for automobile hood, roof top, and trunk deck applications due to their low mechanical properties, and are instead relegated to semi structural applications.

Overall, the SRIM process offers low tooling, equipment, and energy costs; high manufacturing volumes; and produce parts with high tensile strength and flexural modulus. A major drawback preventing these parts from being used as hood, trunkdeck, and exterior body panels is that the surfaces of these molded parts blister upon exposure to the high bake temperatures in paint ovens.

SUMMARY OF THE INVENTION

A fundamental requirement for any surface part on an automobile is that the part is blister free. Therefore, a specific object of this invention is to produce SRIM articles that do not blister upon baking in high temperature ovens. Surprisingly, this object has been accomplished not by varying process parameters, but by changing the nature of the product itself to contain a thin high strength reinforcing fabric comprising spunbonded nonwoven fibers made of a polyester core sheathed in a polyamide skin such as that manufactured by BASF Corporation under the tradename Colback ®, (hereinafter "Colback ® fabric"), as the reinforcing mat/veil embedded in a polyurethane/-polyisocyanurate resin matrix produced by SRIM.

Another object of this invention is to produce SRIM post baked parts that are not only free of surface blisters, but that additionally attain "near Class A" or "Class A" finishes. This object can be achieved by utilizing a soft polyester nonwoven mat such as a Sterling Highloft ® veil as a surface veil over the Colback ® fabric. The various aspects of this invention are more apparent from the detailed description below.

DETAILED DESCRIPTION OF THE INVENTION

The present invention is directed to producing high density reinforced composite polyurethane/-polyisocyanurate molded articles having high strength and blister free surfaces, and additionally "near Class A" or "Class A" finishes. SRIM systems are divided into two broad classes; low density defined as cellular (blown) systems whose resin matrix has a density less than about 1.0 g/cm$^3$ and whose fiber reinforced molded part has a flexural modulus less than about 500,000 p.s.i.; and high density systems defined as essentially noncellular having a density of about 1.0 g/cm$^3$ or greater and flexural modulus of about 500,000 p.s.i. or greater. The flexural modulus values defined herein are obtained according to the test standards set forth in ASTM-D790-86 using a 3 point load and an L/d of 16 to 2 at a crosshead rate of 0.05 inches/minute. The low density systems are entirely unsuited for exterior body parts or parts requiring "Class A" finishes due to their cellular nature and low strength. Furthermore, baking temperatures in paint ovens applied to these cellular molded systems will cause cellular collapse and degradation of the article to the point of rendering it completely useless. Therefore, it is essential that high density polyurethane/polyisocyanurate composites be employed to meet the requisite strength and finish requirements demanded of exterior body panel parts.

A. The Reinforcements and Veils

Various factors account for differences in the surface quality of high density composite SRIM parts, including the flow velocity of the urethane chemical system through the reinforcing fiber matrix, the viscosity of the chemical system, the difference in the coefficient of linear thermal expansion (CLTE) between the resin matrix and the reinforcing fibers, the shrinkage of the urethane phase with respect to the reinforcement, and the presence or absence of a surface veil used with the reinforcement.

These factors have to date prevented high density SRIM final parts from attaining "Class A" finishes. The difference in CLTE between the polyurethane resin matrix of the fiber reinforcement leads to severe shrinkage of the resin matrix with respect to the reinforcement upon demolding and cooling, causing voids, blisters, and surface irregularities to appear on the part. High viscosity systems make it increasingly difficult for the resin to quickly permeate the fiber matrix, resulting in dry spots and air pockets in the molded article. Low permeable reinforcements also make it difficult for the resin matrix to thoroughly penetrate and saturate the mat, leading to air entrainment. Surface veils tend to improve the surface appearance of the molded part, but upon baking, blistering nevertheless occurs by trapped air bubbles either rising to the surface and stretching or rupturing the veil, and/or the trapped air causing the resin matrix to separate from the mat.

It has now been discovered that use of Colback ® fabric solves the problem of surface blistering and irregularities caused by air entrainment in high density SRIM parts. Colback ® fabric is made of spunbonded nonwoven fibers comprising a polyester core sheathed in a polyamide skin. Colback ® fabric is only approximately 0.015 inches (0.038 cm) thick, weighs 0.2622 oz/ft$^2$ (80 g/m$^2$), and has a filament diameter of about 0.00157 inches (0.0040 cm). These dimensional properties make Colback ® useful as a surface veil. However, due to its relatively good tensile strength of 84,800 psi (579 MPa) and trapezoidal tear strength from about 36 lbf. to 58 lbf., Colback ® fabric is also useful as a reinforcing mat. Colback ® fabric can be used as a single, or optionally two or more, layer(s) reinforcement/veil embedded in a polyurethane/polyisocyanate matrix to prevent surface blistering. Several factors are believed to combine to resist the force of blistering upon baking the molded SRIM part when Colback ® fabric is used as a reinforcing mat and/or surface veil. The CLTE of Colback ® fabric, $5 \times 10^{-5}$/°F. ($9 \times 10^{-5}$/°C.), closely matches that of many polyurethane/polyisocyanurate systems which run about $4 \times 10^{-5}$/°F., thereby ameliorating the problem of fabric separation from the polymer matrix on cooling. The fibers in Colback ® fabric are thermally bonded (spunbonded) and uniformly distributed to provide not only high strength in all directions and dimensional stability over a wide range of temperatures, but also higher permeabilities than other mats whose fibers are adhesively bonded. Colback ® fabric's high permeability and relatively good stiffness contributes to easier and quicker penetration throughout the fiber mat by the polyurethane/polyisocyanurate matrix, without wrinkling or warping, resulting in fewer air bubbles. Colback ® fabric is ideally suited to the SRIM process, which features high flow velocities in the manufacture of polyurethane/polyisocyanurate molded parts due to short cure time. The high strength of Colback ® fabric also resists tearing and stretching and traps the few remaining air bubbles attempting to rise to the surface upon baking the paint on the molded part, thus providing a final article that is substantially if not completely blister free. Colback ® fabric also does not scratch the mold surface after repeated use as do glass reinforcing fibers, thus resulting in an improvement against telegraphing scratched mold surfaces to the molded part.

Colback ® fabric can be used in combination with other veils embedded in the show surface side of the molded part to achieve a "near Class A" or "Class A" finish. The show surface side of the molded part is that surface which will ultimately be painted and exposed to the eye for show. A second embodiment of the invention uses a lofty surface fabric, such as Sterling Hiloft ® veil style 4020 (trademark of Sterling Paper Corporation), made of a spunbonded polyester nonwoven fabric with the filaments randomly arranged and highly dispersed, as a show surface veil over a Colback ® fabric veil, both embedded in the polymer matrix. The CLTE of this material is $5 \times 10^{-5}$/°F. which closely matches that of Colback ® fabric and the polyurethane/- polyisocyanurate matrix. Sterling Hiloft ® fabric is softer and more cottony to the touch than Colback ® fabric, and provides a better surface finish on SRIM molded parts than does Colback ® fabric used alone. Sterling Hiloft ® veils, however, have a relatively low trapezoidal tear strength of 17.5 lbf ($7.70 \times 10^6$ dynes), and cannot resist the force of blistering upon baking. Used in combination with Colback ® fabric, however, one may achieve a postbaked part that is blister free with a "near Class A" or "Class A" finish.

A third embodiment of the invention employs a spacer mat reinforcing material beneath a Colback ® fabric and optionally a show surface Sterling Hiloft ® veil over the Colback ® fabric. An exemplary spacer material is Enkamat ® spaced style 5007, 7210, or 7220, manufactured by AKZO, each of which are composed of thermally fused coarse Nylon 6 fibers arranged in a three dimensional geomatrix having about ninety percent or more open space or voids. A typical mat, Enkamat ® spacer style 7220, has a CLTE of about $5 \times 10^{-5}$/°F., again closely matching that of the Colback ® fabric and the polymer matrix. The large voids in the spaces improve the flow of polymer matrix material into adjacent mats, especially if one desires to use several mats or mats made of the denser woven glass fibers. A sandwiching construction of mats around the spacer permits the polymer to permeate both sides of the matting material at about the same time, rather than relying upon diffusion of the polymer through one mat to the next. Thus, one can employ a surface veil/Colback ® fabric/Enkamat spacer construction, or a surface veil/Colback ® fabric/Enkamat spacer/Colback ® fabric sandwiching arrangement.

The traditional material used as a reinforcing mat in high density SRIM parts has been woven glass fibers. An example of such a glass fiber is a Fabmat ® style 2415 glass reinforcement consisting of a woven glass base layer to which chopped fiber glass strands are chemically attached. Due to the relative impermeability of the woven glass mat to the injected polymer, air bubbles become entrained in the molded part which, upon baking, cause the surface to blister. A further reason for a deformed surface arises from the difference in CLTE between the Fabmat ® woven glass mat, which is $3 \times 10^{-6}$/°F. ($5.4 \times 10^{-6}$/°C.), and the polyurethane-polyisocyanurate polymer matrix, the deformations becoming evident also in the form of blisters and swollen spots upon baking. However, it has been discovered that by using Colback ® fabric in combination with glass reinforcing mats, such as Fabmat ® woven glass, the force of blistering can be resisted. Adding Colback ® fabric veil/reinforcing mat to a glass reinforcing mat does not cure the problem of air entrainment in the composite part, but it does resist the force of blistering in spite of the presence of trapped air bubbles, and prevents the formation of voids caused by the matrix resin separating from glass reinforcement which keep apparent at the surface as undulations, waviness, or blisters. Since Colback ® fabric is more expensive than glass reinforcement, this combination of a Colback ® veil with larger amounts of glass reinforcement becomes an attractive alternative when high glass or reinforcement loadings are desired. Each of the above embodiments can incorporate a random and/or woven glass mat as the primary reinforcing material, to which Colback ® fabric is added and optionally a spacer mat such as an Enkamat ® spacer and/or a surface veil such as a Hiloft ® veil. Due to the relative impermeability of woven glass mats, the advantage of an Enkamat ® spacer sandwiched between layers of the glass mats becomes more pronounced since the polymer can penetrate both surfaces of the glass mats at about the same time.

The invention is not limited to employing Colback ® fabric over glass reinforcing mats. Colback ® fabric is useful in combination with other woven or nonwoven, continuous or discontinuous reinforcements such as fibers of mineral or slag wool, asbestos, boron, aluminum oxide, carbon, steel, wool, cellulose, polyamides, polyacrylic, polyvinyl alcohol, polycarbonate, and polyurethane. These fibers may optionally be chopped, incorporated into the resin "B side", and subsequently injected into the mold containing at least a Colback ® fabric. However if one desires to additionally use incorporated chopped fibers, the viscosity of polymer upon injection must remain within the range set forth below in the description of the resin matrix.

B. The Polyurethane/Polyisocyanurate Resin Matrix

The polyurethane polyisocyanurate matrix of the subject high density SRIM system comprises one or more "A Side" polyisocyanates and a "B Side" isocyanate-reactive resin component containing, for example, polyhydroxyl functionalities and optionally less than 4 weight percent of a chain extender. The polyurethane matrix is herein broadly defined as the reaction of a di or polyisocyanate functionality with a reactive hydrogen functionality yielding such products as polyurethane moieties or polyurea moieties if the reactive hydrogen is from an amine, and is also defined as the trimerized di or polyisocyanates yielding polyisocyanurate moieties. Traditional polyurethane-polyisocyanurate system components such as chain extenders, fillers, flame retardants, catalysts, and UV stabilizers, may also be added when necessary or desirable.

Polyisocyanates which may be used as the "A Side" isocyanate component include the modified and unmodified polyisocyanates which are well known to those skilled in the art. Unmodified polyisocyanates include aromatic and aliphatic polyisocyanates such as 2,4- and 2,6-toluene-diisocyanates, 2,4-, and 2,6-methylcyclohexyldiisocyanates, and polyphenylenepolymethylenepolyisocyanates. Mixtures of the above isocyanates as well as crude polyisocyanates, particularly less highly refined mixtures of the diphenylmethanediisocyanates and polyphenylenepolymethylenepolyisocyanates (crude MDI) are useful.

Modified polyisocyanates may also be useful, particularly those isocyanates which have reduced viscosity. Examples of modified polyisocyanates include urethane, urea, biuret, and carbodiimide modified polyisocyanates. Such modified polyisocyanates are well known to those skilled in the art. Preferred isocyanates are the various diphenylmethane-diisocyanates, their higher ring oligomers and their mixtures. Such a preferred isocyanate comprises a mixture of about 60% by weight 4,4'-diphenylmethanediisocyanate, about 5% by weight 2,4'-diphenylmethanediisocyante, and about 35% by weight polyphenylenepolymethylenepolyisocyanate with a functionality of approximately 2.2. Modified diphenylmethanediisocyanates and mixtures of such isocyanates with unmodified diphenylmethanediisocyanates and/or polyphenylenepolymethylene polyisocyanates are also preferred. Examples of such preferred isocyanates are a mixture of about 75% by weight 4,4'-diphenylmethanediisocyanate (only a trace amount of about 1.5% 2,4'-MDI being present) and about 25% uretonimine modified diisocyanates manufactured by BASF Corporation under the tradename LUPRANATE® MM-103.

Representative isocyanate-reactive resin components which may be employed in the high density SRIM process include polyhydroxyl-containing polyesters, polyoxylalkylene polyether polyols, polyhydroxy-terminated polyurethane polymers, polyhydroxyl-containing phosphorous compounds, and alkylene oxide adducts of polyhydric sulfur-containing esters, polyacetals, aliphatic polyols and thiols, ammonia, and amines including aromatic, aliphatic, and heterocyclic amines, as well as mixtures thereof. Especially preferred are hydroxyl functional tertiary amine polyether polyols prepared by oxyalkylating an aliphatic or aromatic amine preferably an aliphatic amine with an alkylene oxide. Alkylene oxide adducts of compounds which contain two or more different groups within the above-defined classes may also be used such as amino alcohols which contain an amino group and a hydroxyl group. Also, alkylene oxide adducts of compounds which contain one-SH group and one —OH group as well as those which contain an amino group and a —SH group may be used.

The type of isocyanate reactive component used depends on the desired application and processing conditions. A prime processing consideration in high density SRIM products is the viscosity of the polymer injected into the mold. The flow of a low viscosity polymer through a veil or a reinforcing mat is better than that of high viscosity polymers, resulting in a more even and rapid distribution of polymer in and around the mat, less chance of wrinkling or moving the mat, and fewer air bubbles. On the other hand, the viscosity of the polymer should not be so low that air is trapped in the polymer upon injection through a foaming or frothing action. To help reduce the amount of air entrainment, the viscosity of the polyurethane matrix system is kept between 10 to 2000 cps, preferably about 100 to 300 cps.

Although polyhydroxyl containing polyesters are adequate isocyanate reactive components in the manufacture of polyurethanes, their high viscosities do not lend themselves well to the production of high density SRIM composites where good surfaces are desired. However, polyester polyols can be used generally in the production of polyurethanes for SRIM composites. Polyester polyols and their methods of preparation are well known in the art and are described in U.S. Pat. Nos. 1,922,451, 2,764,619, 1,922,459, 3,190,927, and 3,346,557 herein incorporated by reference.

Any suitable polyoxyalkylene polyether polyol resulting in a polyurethane having a viscosity within the above range may be used, such as the polymerization product of an alkylene oxide or of an alkylene oxide with a polyhydric alcohol. Any suitable polyhydric alcohol may be used such as those disclosed above for use in the preparation of the hydroxy-terminated polyesters. Any suitable alkylene oxide may be used such as ethylene oxide, propylene oxide, butylene oxide, amylene oxide, and mixtures of these oxides. The polyalkylene polyether polyols may be prepared from other starting materials such as tetrahydrofuran and alkylene oxide-tetrahydrofuran mixtures; epihalohydrins such as epichlorohydrin; as well as aralkylene oxides such as styrene oxide. The polyoxyalkylene polyether polyols may have either primary or secondary hydroxyl groups. Included among the polyether polyols are polyoxyethylene glycols, polyoxypropylene glycols, polyoxybutylene glycols, polytetramethylene glycols, block copolymers, for example, combinations of polyoxypropylene and polyoxyethylene glycols, poly-1,2-oxybutylene and polyoxyethylene glycols, poly-1,4-tetramethylene and polyoxyethylene glycols, and copolymer glycols prepared from blends or sequential addition of two or more alkylene oxides. The polyoxyalkylene polyether polyols may be prepared by any known process such as, for example, the process disclosed by Wurtz in 1859 and *Encyclopedia of Chemical Technology*, Vol. 7, pp. 257–262, published by Interscience Publishers, Inc. (1951) or in U.S. Pat. No. 1,922,459. Examples of suitable polyoxyalkylene polyether polyols are ethylene propylene and butylene oxide adducts of ethylene glycol, propylene glycol, butylene glycol, glycerol, 1,1,1-trimethylolpropane, 1,1,1-trimethylolethane, 1,2,6-hexanetriol, a-methyl-glucoside, pentaerythritol, sorbitol, 2,2'-(4,4'-hydroxyphenyl) propane and sucrose, and mixtures thereof.

Suitable polyhydric polythioethers which may be condensed with alkylene oxides include the condensation product of thiodiglycol or the reaction product of a dicarboxylic acid such as is disclosed above for the preparation of the hydroxyl-containing polyesters with any other suitable thioether glycol.

Polyhydroxyl-containing phosphorus compounds which may be used include those compounds disclosed in U.S. Pat. No. 3,639,542.

Suitable polyacetals which may be condensed with alkylene oxides include the reaction product of formaldehyde or other suitable aldehyde with a dihydric alcohol or an alkylene oxide such as those disclosed above.

Suitable aliphatic thiols which may be condensed with alkylene oxides include alkanethiols containing at least two —SH groups such as 1,2-ethanedithiol, 1,2-propanedithiol, 1,3-propanedithiol, and 1,6-hexanedithiol; alkene thiols such as 2-butane-1,4-dithiol: and alkane thiols such as 3-hexyne-1,6-dithiol.

Particularly preferred isocyanate reactive "B Side" components are hydroxyl-functional tertiary amine polyether polyols. Polyurethane-polyisocyanurate systems prepared by reacting certain tertiary amine polyols have a low viscosity and provide crack and distortion free parts with high heat distortion temperatures ranging from about 250° F. to 400° F. These polyols are prepared by oxyalkylating an aliphatic or aromatic amine, preferably an aliphatic amine, with an alkylene oxide. Examples of suitable aromatic amines which are useful as initiators include the various phenylenediames, toluenediamines, and diphenylmethanediamines. Examples of suitable aliphatic amines include ethylenediamine, propylenediamine, 1,4-butanediamine, 1,6-hexanediamine, diethylenetriamine, triethylenetetraamine and the like. Hydroxyalkylamines may also be useful, for example 2-hydroxyethylamine (monoethanolamine) and 2- and 3-hydroxypropylamine, bis[2-hydroxyethyl]ethylamine, tris[2-hydroxyethyl]amine and the like. Preferred initiators are 2-hydroxyethylamine or 2-hydroxypropylamine and bis[2-hydroxyethyl]-2-hydroxypropylamine.

The amine or hydroxyalkylamine initiators are oxyalkylated with sufficient alkylene oxide to convert at least one and preferably all amino groups to tertiary amino groups. As alkylene oxides may be mentioned ethylene oxide, propylene oxide, and butylene oxide. Mixtures of these alkylene oxides may be used, or they or their mixtures may be used sequentially to form homopolymeric, block, heteric, or block-heteric polyether polyols. The process of preparation of such polyether polyols is conventional and is well known to those skilled in the art.

Preferred hydroxyl-functional tertiary amine polyether polyols are polyoxypropylated 2-hydroxyethylamines or 2-hydroxypropyl-amines. Such polyols are trifunctional and may have molecular weights from about 194 to about 2000 and hydroxyl numbers from 50 to about 600, preferably from 250 to about 600, and most preferably about 500. Polyols with lower hydroxyl numbers tend to make the polyurethane-polyisocyanurate product more flexible, usually at the expense of the heat distortion temperature. Lower molecular weight, higher hydroxyl number polyols are used to prepare more rigid products. A preferably hydroxy-functional tertiary amine polyether polyol is a trifunctional monoethanolamine propylene oxide ethylene oxide adduct containing about 55% wt. % polyoxypropylene moieties capped with polyoxyethylene amounting to about 26 wt. % of the final product, having a hydroxyl number of about 500.

The flexibility of the SRIM product matrix may also be adjusted by including lower or higher functionality hydroxyl-functional tertiary amine polyether polyols. For example, inclusion of polyols with a functionality of two lowers the crosslink density thus increasing flexibility, while inclusion of polyols with a functionalities of from 4 to 6 or higher lead to an increase in crosslink density and viscosity. In general, systems with higher crosslink densities have greater rigidity and higher heat distortion temperatures.

Useful in minor amounts are amine initiated polyether polyols which have free amino hydrogens and hydroxyl-functional polyoxyalkylene moieties. Such polyols are prepared as taught by U.S. Pat. No. 4,517,383, by oxyalkylating an aliphatic or aromatic amine with a stoichiometric excess of alkylene oxide, but utilizing an extraordinarily high amount of basic oxyalkylation catalyst which must be present at the onset of oxyalkylation. Such dual-functionality asymmetric polyols create both urethane and urea linkages in the finished product, and further have the advantage of lower viscosities than their fully oxyalkylated, symmetrical analogues.

Also useful in minor amounts, are conventional polyether polyols and acrylonitrile/styrene graft polymer polyol dispersions. Both these types of polyols are well known items of commerce, and generally have functionalities from two to about eight, preferably from 2 to about 3, and hydroxyl numbers from 20 to about 600, preferably from 20 to about 500. The use of such polyols increases the urethane linkages in the finished product. Use of graft polyols may increase the flexural modulus and tensile strength. In high density SRIM systems the minor amount should be less than about 4 weight percent based on the total system weight.

The flexural modulus, heat distortion temperature, and rigidity of the matrix may also adjusted by varying the urethane/isocyanurate content of the product. The isocyanurate content is increased by increasing the ratio of isocyanate (A side) to polyol (B side). In general, isocyanate indices of from 100 to about 700 are useful, preferably from 120 to about 300, and most preferably from 150 to 250.

Useful isocyanate to resin ratios range from 70/100 to 250/100, preferably around 165/100. Ratios of isocyanate to resin higher than 165/100 tend to improve heat deflection temperatures but are accompanied with a loss in Izod impact characteristics.

Hydroxyl-functional and amine-functional chain extenders may be used in high density SRIM systems. Preferred hydroxyl-functional chain extenders are ethylene glycol, glycerine, trimethylolpropane, 1,4-butanediol, propylene glycol, dipropylene glycol, 1,6-hexanediol, and the like. Suitable amine-functional chain extenders include the sterically hindered amines such as diethyltoluene diamine and the other hindered amines disclosed in Weber U.S. Pat. No. 4,218,543. In high density SRIM systems, the amount of chain extender useful is generally very low, i.e. less than about 4 weight percent, and lower when a conventional or graft polyol is used. Prepolymers, particularly those prepared by reacting di- or polyisocyanates with polyester polyols may be used. Such prepolymers may desirably lower the system reactivity.

In high density SRIM systems, generally no plasticizer is used, although very minor amounts, i.e. less than about 4 weight percent may be useful in some applications, such as some exterior automotive body where a great deal of stiffness is not desired.

Mold releases, both external and internal, may be utilized. Internal mold releases are generally mixtures of long chain carboxylate salts, particularly ammonium and substituted ammonium stearates, and calcium and zinc stearates. External mold releases are well known commercial products and include waxes and silicones, for example.

Flame retardants may also be used when required by the formulation. Suitable flame retardants are well known to those skilled in the art, but the low molecular weight halogenated phosphate esters, polyhalogenated biphenyls and biphenyloxides and the like may be used when flame retardants are necessary. As the presence of such flame retardants generally causes a decrease in physical properties, use of flame retardants is not preferred.

In high density SRIM systems, a water scavenger may be useful to prevent any blowing by trace amounts of water. Suitable water scavengers may be silica gels, anhydrous silica, and molecular sieves. A suitable molecular sieve which is available commercially is a Baylith ® Paste L molecular sieve from the Mobay Chemical Company.

Ultraviolet stabilizers and absorbers may also be useful. Such stabilizers generally act by absorbing ultraviolet radiation. Many such ultraviolet absorbers are commercially available, such as the UVINUL ® absorbers manufactured by BASF Corporation, Parsippany, N.J.

Catalysts may also be useful, and are preferred in high density systems. Suitable catalysts include both urethane and isocyanurate reaction promoting catalysts, and are well known to those skilled in the art of polyurethanes. The presence of at least an effective amount of isocyanurate promoting catalyst is necessary to form an isocyanurate. This catalyst may be purposely added, or may be present in the polyol by neutralization of the alkali metal polyoxyalkylation catalyst with a carboxylic acid. Preferred urethane catalysts are amine catalysts such as those available commercially from Air Products Chemical Company known as DABCO ® X-8154 and DABCO ® 33LV catalysts. Preferred trimerization (isocyanurate) catalysts are metal carboxylates such as potassium 2-ethylhexanoate and potassium acetate. The latter is advantageously utilized as a 40 weight percent solution in ethylene glycol, referred to herein as KX25. The catalysts such as dibutyltindilaurate and dibutyltindiacetate are also useful urethane catalysts. Mixtures of amine and tin or other catalysts may be used. The total catalyst concentration is from 0.001 to 5 weight percent of the polymer matrix.

Fillers can also be used in the present invention so long as the viscosity of the polymer injected into the mold remains within the range of 10-2000 cps. Fillers can be organic or inorganic, weight increasing agents, agents to improve wear in paints or coatings, or dyes and pigments. Typical examples are silicate minerals; metal oxides of aluminum, titanium, or iron; metal salts such as chalk or barium sulfate; pigments such as cadmium sulfide or zinc sulfide; glass, aluminum silicate, coprecipitates of barium sulfide and aluminum silicate; coals, melamines, pine resin, and graft polymers mentioned above.

C. Surface Quality Measuring Techniques

There are currently no definitive nationally accepted standards by which one may determine whether an article has a "near Class A" or "Class A" surface finish. Two quantitive measurements serving as reliable indicators of a "Class A" finish are a Distinctness of Image (DOI) test and a Profilometer surface profile. Visual inspection, DOI, and profilometer analysis are generally in good agreement with each other, so a substrate that looks and feels smooth, uniform and glossy will exhibit high DOI and low roughness profile values.

DOI is a description of the quality of a reflected image, which can be distorted by short term waviness, an effect sometimes referred to as orange peel, and long term waviness often caused by improper layup of the reinforcement in the mold or shrinkage of the polymer matrix with respect to the fiber reinforcement due to differences in CLTE. DOI values from 80 to 90 are acceptable for vertical exterior automotive surfaces, and values from 91 to 99 are required for horizontal automotive exterior surfaces. Thus, "near Class A" or "Class A" finishes require DOI values of at least 80, preferably 90. A loose comparison of DOI values for different painted substrate materials appear in Table I as illustrations.

TABLE 1

| Typical Material DOI Values | |
|---|---|
| | DOI |
| Steel | 99 |
| SMC | 90-99 |
| Polyurea RIM | |
| 22% Mica | 95 |
| 23% Wollastokup | 85 |
| 25% Milled Glass Fiber | 70 |
| 20% Flakeglass | 65 |

The DOI values in the working examples which follow were obtained using an ATI System Inc. Model #1792 meter capable of measuring the sharpness of reflected mirror images from a product's surface finish. The DOI values reported herein are an average of 5 numbers collected from one corner of a plaque to the opposite corner of the plaque.

Surface profile values are a measure of the surface roughness expressed as a roughness average (RA), or more specifically, is defined as the arithmetic average of all departures of the roughness profile from the mean line measured within the sampling length. Surface profiles were obtained in both the flow (X) direction and the direction across the flow (y), using a Mahr Perthen perthometer with a 1 micron diamond stylus run across trace lengths typically 0.69 inches but no longer than 2.2 inches.

EXAMPLES

In the high density SRIM process of this invention, injection velocities range from 0.01 to 1.8 m/s, preferably around 0.1 to 0.25 m/s. The viscosity of the matrix resin is, as stated above, kept around 10-2000 cps, preferably 100-300 cps at 25° C., and injected under a pressure of from 190 to 250 psi into a closed mold heated or unheated, preferably heated at 100°-180° C. containing from greater than zero to 70 wt. % reinforcement and-/or veil material, preferably from about 20 weight percent to about 50 weight percent, of the cured molded part. Residence times in the mold range from 0.25 to 12 minutes, preferably 0.25 to 5 minutes.

In step 1, twenty five high density, essentially non-cellular polyurethane/polyisocyanurate composite plaques were manufactured by the SRIM process according to the procedure set forth below, and tested for their surface characteristics. The plaques were subsequently baked with primer/paint in step 2 and again tested for their surface characteristics.

Step 1

The polyurethane system employed as the polymer matrix is produced by BASF under the tradename Elastolit ®SR. The "A side" polyisocyanate used is manufactured by BASF Corporation in Parsippany, N.J. under the tradename Lupranate ® M-10. This isocyanate is a solvent free mixture of about 35 wt. % polyphenylene polymethylenepolyisocyanate, about 60 wt. % 4,4' methylene diphenyldiisocyanate, and about 5 wt. % 2,4' methylene diphenyldiisocyanate, the mixture having a functionality of about 2.2. The resin "B side" comprises about 98 wt. % of a light yellow solvent-free trifunctional monoethanolamine propylene oxide ethylene oxide adduct containing 55 wt. % polyoxypropylene moieties capped with 26 wt. % polyoxyethylene units having a hydroxy number of about 500 and an average molecular weight of about 335. The "B side" resin further contains about 1 wt. % of a Mobay Baylith Paste ® L water scavenger, 0.3 wt % of a Dabco ® 33-LV amine catalyst manufactured by Air Products Corporation, and about 0.7 wt. % of a trimerization catalyst made of about 40% potassium acetate in ethylene glycol to promote the formation of isocyanurate. The ratio of isocyanate to resin was 165/100.

The five gallon day tanks containing the components were cooled or heated as necessary, to 68° F., 86° F., or 104° F., to vary the initial viscosity of the reactants. The isocyanate component was impingement mixed at about 2800 psi with the resin component and injected under a pressure of approximately 200 p.s.i. using an EMB PU-30 urethane dispensing machine. The urethane was center injected from the top into a closed mold water heated at 155° F. for all 25 sample plaques at mass flow rates around 1 lb/sec, and at injection velocities varying from plaque to plaque.

The number and type of reinforcing mat or veil were varied from plaque to plaque. A description of the reinforcing/veils along with the mass flow rates, day tank temperatures, and injection velocities for each unbaked plaque sample appears below in Table 2.

TABLE 2

Description of Unbaked Plaque Samples

| Plaque | Velocity ft/s:m/s | Mass Flow Rate lb/s:g/s | Layers of Woven Glass Reinforcement | Weight % of Glass Reinforcement | Day Tank Temp. °F. | Type of Additional Reinforcement Veil |
|---|---|---|---|---|---|---|
| 1 | 0.44:0.13 | 0.959:435 | 0 | 0 | 68 | None |
| 2 | 0.50:0.15 | 1.120:508 | 0 | 0 | 68 | None |
| 3 | 0.34:0.10 | 0.700:317 | 0 | 0 | 68 | None |
| 4 | 0.39:0.12 | 0.700:317 | 2 | 28 | 68 | Glass |
| 5 | 0.37:0.11 | 0.700:317 | 1 | 13 | 68 | Glass |
| 6 | 0.51:0.16 | 0.959:435 | 2 | 28 | 68 | Glass |
| 7 | 0.48:0.15 | 0.959:435 | 1 | 13 | 68 | Glass |
| 8 | 0.58:0.18 | 1.120:508 | 2 | 28 | 68 | Glass |
| 9 | 0.54:0.16 | 1.120:508 | 1 | 13 | 68 | Glass |
| 10 | 0.70:0.21 | 1.120:508 | 4 | 49 | 68 | Glass |
| 11 | 0.61:0.19 | 0.595:435 | 4 | 49 | 68 | Glass |
| 12 | 0.47:0.14 | 0.700:317 | 4 | 49 | 68 | Glass |
| 13 | 0.66:0.20 | 1.050:476 | 4 | 49 | 86 | Glass |
| 14 | 0.54:0.16 | 1.050:476 | 2 | 28 | 86 | Glass |
| 15 | 0.66:0.20 | 1.050:476 | 4 | 49 | 104 | Glass |
| 16 | 0.54:0.16 | 1.050:476 | 2 | 28 | 104 | Glass |
| 17 | 0.65:0.20 | 0.959:435 | 4 | 49 | 68 | Glass + Enkamat ® Spacer |
| 18 | 0.62:0.19 | 0.959:435 | 4 | 49 | 68 | Glass + Surmat ® Veil |
| 19 | 0.62:0.19 | 0.959:435 | 4 | 49 | 68 | Glass + Hiloft ® Veil |
| 20 | 0.62:0.19 | 0.959:435 | 4 | 49 | 68 | Glass + Colback ® Veil |
| 21 | 0.62:0.19 | 0.959:435 | 4 | 49 | 68 | Glass + TPU Film |
| 22 | 0.62:0.19 | 0.959:435 | 4 | 49 | 68 | Glass + In-mold Paint |
| 23 | 0.61:0.19 | 0.959:435 | 4 | 49 | 68 | Glass + In-mold Paint + Hiloft ® Veil |
| 24a | 0.63:0.19 | 0.959:435 | 4 | 49 | 68 | Glass + SRIM Coat |
| 24b | 0.61:0.19 | 0.959:435 | 4 | 49 | 68 | Glass |

As can be seen from the Table, plaques 1-3 are unreinforced; 4-24b are reinforced with Fabmat ® style 2415 woven glass reinforcements in 1, 2, and 4 layers; 17 employs an Enkamat ® spacer sandwiched between 4 layers of Fabmat ® glass mats; 18 employs a 0.01 inch thick Surmat ® style 100 glass surface veil produced by Nico the fibers of which are bonded by about 6 wt. % polyester and has a weight of 0.1305 oz/ft² (39,81 g/m²), a fiber diameter of 0.00 077 inches (0.00195 cm), a tensile strength of 250,000 psi (1723 MPa), and a CLTE of $3\times10^{-6}$/°F. ($5.4\times10^{-6}$/°C.), over Fabmat ® glass reinforcement; 19 employs a Hiloft ® surface veil over the glass reinforcement; 20 employs a Colback ® surface veil over the glass reinforcement; 21 employs a thermoplastic polyurethane film to protect the mold and bonded to the plaque surface; 22 was made with an in-mold paint; 23 added a Hiloft ® veil to 22; 24a was topcoated with an extra 0.125 inches (3.175mm) of unreinforced SRIM polyurethane-polyisocyanurate matrix resin after production of the glass reinforced plaque; and 24(b) is a comparative sample against 24a.

The mold employed to produce each of these plaques was constructed of aluminum measuring 59"×9.5" manufactured by Expert Hydraulics and could potentially provide about 30 tons of clamping force under 2,000 to 2,200 p.s.i. hydraulic pressure. The mold could also be made of steel or iron. The mold was not equipped for vacuum assist nor did it have special vents and shear edges. A mold with any of these features present, however, will improve the overall quality of the plaque. A polished aluminum plaque tool insert measuring 12"×9" was placed on the mold surface approximately 7.75 inches from the center injection point. That portion of the molded plaque corresponding to the section formed against the polished insert was then cut out and subjected to surface analysis by a DOI meter from ATI, model #1792, and by a Mahr Perthen perthdometer to measure surface profiles. The measurements were taken on unbaked plaques in accordance to the method previously described herein, and the results are set forth in Table 3.

TABLE 3

DOI and RA Valves Taken From Prebaked Plaques

| Plaque | DOI | RA x-dir | RA y-dir |
|---|---|---|---|
| 1 | 49 | 1.39 | 0.81 |
| 2 | 46 | 1.14 | 0.75 |
| 3 | 49 | 1.16 | 0.84 |
| 4 | 28 | 1.17 | 1.89 |
| 5 | 28 | 1.04 | 1.01 |
| 6 | 31 | 0.67 | 0.73 |
| 7 | 27 | 0.81 | 1.92 |
| 8 | 34 | 0.63 | 0.96 |
| 9 | 32 | 0.64 | 0.44 |
| 10 | 42 | 0.85 | 0.35 |
| 11 | 42 | 1.14 | 0.84 |
| 12 | 38 | 0.73 | 0.72 |
| 13 | 41 | 0.90 | 1.37 |
| 14 | 38 | 0.69 | 0.55 |
| 15 | 41 | 0.67 | 0.64 |
| 16 | 28 | 0.72 | 0.75 |
| 17 | 40 | 1.65 | 1.21 |
| 18 | 46 | 0.41 | 0.61 |
| 19 | 48 | 0.31 | 0.29 |
| 20 | 41 | 0.41 | 0.61 |
| 21 | — | 5.36 | 2.98 |
| 22 | 42 | 0.44 | 0.43 |
| 23 | 45 | 0.41 | 0.23 |
| 24a | — | 0.73 | 0.43 |
| 24b | — | 0.75 | 1.42 |

These preliminary results indicate the following. Unreinforced plaques showed good surface quality by visual inspection and by DOI values. It is unclear why the surface roughness values were high for unreinforced plaques. The results from plaques 4-9 indicate that higher flow velocities lead to better surface quality of the unpainted SRIM surface. The DOI and RA values for plaques 10-12 were loaded with a higher percentage of glass than plaques 3-9. Even at a decreased flow velocity of 0.47 ft/s for plaque 12, it can be seen that higher glass loading leads to improved surface quality for unbaked SRIM parts. The improvement may be partially due to higher injection velocities imposed by the higher glass loading in the mold, but as noted above, even at a velocity of 0.47 ft./s, surface quality is nevertheless improved. Plaques 13-16 were made at higher day tank temperatures to ascertain the effect of viscosity on surface quality. The results indicated that lower viscosity at higher temperatures does not appreciably affect the surface quality of unbaked SRIM parts at higher glass loadings, at least at the temperature ranges tested. At lower glass loadings of around 28 wt. %, a comparison of plaques 8, 14, and 16 indicates that there is an optimum viscosity which will yield the best surface quality. Thus, the optimum viscosity must be determined on a case by case basis taking into account the glass loading, the chemical system used, and the desired injection velocity. Plaque 17 with a layer of an Enkamat ® spacer did not appreciably affect surface quality over other plaques with the same glass loading. Plaques 18-20 were made with surface veils and brought about the greatest improvement in surface quality. Of the three, Hiloft ® veil brought about the best improvement. The Colback ® veil did not bring about an appreciable improvement in unbaked surface quality over unveiled plaques with the same glass loading.

Step 2

Once these unbaked plaques were tested for preliminary surface profiles and DOI, each was painted with a 0.0006 inch thick conductive primer layer and an acrylic base coat/clear coat system 0.0024 inches thick. After each paint layer was applied, the plaque was baked in an oven at 260° F. (127° C.) for 30 minutes. The painted baked plaques were again analyzed for surface profile and DOI.

All primed and base/clear coat baked plaques except plaques 1, 2, 3, 17, 20, and 24a became severely blistered at the surface because the trapped air expanded upon baking causing the resin to separate from the fiber mats and/or rose to the surface. Thus, even though molded prebaked plaques 10, 11, 13, 15, 18, 19, 22, and 23 initially possessed good surface quality, upon baking it became apparent that these samples did not resist the force of blistering.

Unreinforced plaques 1-3 went through the oven bake without difficulty and achieved DOI values in the 90's. However, the low strength of these unreinforced plaques, which are not SRIM parts, renders them inadequate in exterior automotive body applications.

Plaque 17 with Enkamat ® spacer did not show surface blistering as did the other plaques due to the spacers high permeability permitting polymer flow to both sides of the glass reinforcement at about the same time. However, an Enkamat ® spacer is quite thick and is not as desirable as Colback ® fabric where one desires to fabricate thin or small parts.

Plaque 20 with a Colback ® surface veil successfully resisted the force of blistering upon baking while plaques with other surface veils which initially exhibited higher DOI values became severely blistered upon baking.

Sample 24(a) with a top surface of unreinforced polymer also resisted the force of blistering. However, this plaque adds about 45-60 longer seconds to the cycle time since the mold must be slightly opened after forming the in mold SRIM part and subsequently injected with more polymer.

The plaque with Colback ® was the most desirable since processing steps were fewer and easier, the veil is thinner than an Enkamat ® spacer allowing for a thinner part, and the veil possesses a superior tensile strength to Enkamat ®. Thus, Colback ® fabric achieved the first object of this invention.

None of the high density SRIM plaques 17, 20, or 24a achieved DOI values in the 80's or 90's necessary for a "near Class A" or "Class A" finish. Plaque sample 20 with Colback ® fabric did achieve a "Class B" finish which would have suitable application in, for example, an automotive rocker panel. However, based on the results discussed herein, "near Class A" or "Class A" surfaces may be achieved by employing any one of the proposed structures described below. In manufacturing any one of these structures, high chemical injection velocities of reactant are desirable, and if glass is employed, high glass loadings are also desirable.

To additionally achieve a "near Class A" or a "Class A" surface, one may create a high density SRIM substrate employing a Colback ® veil to resist internal substrate stresses, air entrainment, and the force of blistering, over which is placed a fluffy Highlight ® veil yielding a smooth, unblistered, glossy "near Class A" or "Class A" surface finish on a strong part. Without the Colback ® veil present, a part with only a Highlight ® veil would blister. Optionally, glass fiber, metal fibers, carbon fibers, or Kevlar can be added along with an Enkamat ® spacer to help glass wet out. Using a Highloft ® veil also limits mold surface scratching and the telegraphing of those scratches into the molded surface.

Another embodiment which achieves a "Class A" surface is to apply a topcoat layer of unreinforced polymer to the first embodiment above. The topcoat will lead to DOI values in the 90's and provides the added flexibility of dispersing low profile additives into the coat which might otherwise mechanically weaken the substrate if added directly to the reinforced substrate.

I claim:

1. An essentially noncellular structural reaction injection molded composite having a density of about 1.0 g/cm$^3$ or greater and a flexural modulus of about 500,000 p.s.i. or greater, comprising a fabric embedded in a polyurethane matrix, said fabric comprised of a nonwoven spunbonded fibers having a polyester core sheathed in a polyamide skin, and said polyurethane matrix having a viscosity from about 10 to about 2,000 cps., at 25° C., upon injection into a mold.

2. The composite of claim 1, wherein said composite further contains a show surface nonwoven spunbonded polyester veil over said fabric.

3. The composite of claim 2, wherein said composite further contains woven glass reinforcing fibers beneath said show surface veil.

4. The composite of claim 2, wherein said polyurethane matrix comprises the reaction product of polyisocyanate component and a resin component, said polyisocyanate component comprising a mixture of about 75% by weight diphenylmethanediisocyanate and 25% by weight uretonimine.

5. The composite of claim 1, wherein said composite further contains a spacer mat comprised of fused nylon monofilaments in a three dimensional geomatrix.

6. The spacer mat of claim 5, wherein said monofilaments are about 0.012 to 0.014 inches in diameter.

7. The composite of claim 1, wherein said composite contains a spacer mat comprised of fused nylon monofilaments in a three dimensional matrix beneath said fabric and a show surface nonwoven spunbonded polyester veil over said fabric.

8. The composite of claim 1, wherein said composite further contains woven glass reinforcing fibers.

9. The composite of claim 5 wherein said composite further contains woven glass fibers between said fabric and said spacer mat.

10. The composite of claim 1, wherein said polyurethane matrix comprises the reaction product of a polyisocyanate component and a resin component, said polyisocyanate comprising a mixture of about 60% by weight 4,4'-diphenylmethanediisocyanate, about 5% by weight 2,4-diphenylmethanediisocyanate, and about 35% by weight polyphenylenepolymethylenepolyixoyanate, the mixture having a functionality of about 2.2.

11. The composite of claims 4 or 10, wherein said resin comprises a hydroxyl functional tertiary amine polyether polyol.

12. The composite of claims 4 or 10, wherein said resin comprises a trifunctional monoethanolamine propylene oxide ethylene oxide adduct containing about 55% by weight polyoxypropylene moieties capped with polyoxyethylene amounting to about 26% by weight of the adduct, and having a hydroxyl number of about 500.

13. The composite of claim 12, wherein said resin further contains a metal carboxylate trimerization catalyst.

14. The composite of claim 12, wherein said trimerization catalyst comprises a 40 weight percent potassium acetate solution in ethylene glycol.

15. A process of making an essentially noncellular structural reaction injection molded composite having a density of about 1.0 g/cm$^3$ or greater and a flexural modulus of about 500,000 p.s.i. or greater, comprising reacting in the presence of a polymerization catalyst a polyisocyanate, an isocyanate reactive component containing active hydrogen functionalities and optionally a:
 a) water scavenger, a
 b) chain extender, a
 c) trimerization catalyst, a
 d) flame retardant, or
 e) fillers, or
 f) mixtures thereof, and injecting the reaction mixture having a viscosity from about 10 to about 2,000 cps. at 25° C. into a mold containing a material comprised of nonwoven spunbonded fibers made of a polyester core sheathed in a polyamide skin.

16. The process of claim 15, wherein the reaction mixture is injected at a pressure from about 190 p.s.i. to 250 p.s.i.

17. The process of claim 15, wherein said mold is heated to a temperature from about 130° to about 180° C.

18. The process of claim 15, wherein the reaction mixture is injected at a velocity from about 0.1 to 0.25 m/s.

19. The process of claim 15, wherein the reaction mixture viscosity ranges from about 100 cps. to 300 cps. at 25° C.

20. The process of claim 15, wherein said polyisocyanate comprises a mixture of about 60% by weight 4,4'-diphenylmethanediisocyanate, about 5% by weight 2,4-diphenylmethanediisocyanate, and about 35% by weight polyphenylenepolymethylenepolyisocyanate, the mixture having a functionality of about 2.2.

21. The method of claim 15, wherein said isocyanate reactive component comprises a hydroxyl functional tertiary amine polyether polyol.

22. The method of claim 21, wherein said polyol comprises a trifunctional monoethanolamine propylene oxide ethylene oxide adduct containing about 55% by weight polyoxyproplene moieties and capped with polyoxyethylene amounting to about 26% by weight of the adduct, and having a hydroxyl number of about 500.

23. The method of claim 21, wherein said trimerization catalyst comprises a metal carboxylate.

24. The method of claim 15, wherein said mold further contains a material selected from the group consisting of a nonwoven spunbonded polyester veil, a spacer mat of fused nylon monofilaments in a three dimensional geomatrix, woven glass fibers, woven carbon fibers, and combinations thereof.

* * * * *